United States Patent [19]

Nelson

[11] 3,819,982

[45] June 25, 1974

[54] LOW NOISE DIMMER FOR FLUORESCENT LAMPS

[75] Inventor: Fred Eugene Nelson, Cranston, R.I.

[73] Assignee: General Electric Company, New York, N.Y.

[22] Filed: Nov. 30, 1972

[21] Appl. No.: 310,680

[52] U.S. Cl. .............................. 315/94, 315/DIG. 4

[51] Int. Cl. .......................................... H05b 39/00

[58] Field of Search ..................... 315/DIG. 4, 94 C; 323/17 C, 22 C

[56] References Cited

UNITED STATES PATENTS

| | | | |
|---|---|---|---|
| 3,636,379 | 1/1972 | Moe et al. | 307/262 X |
| 3,719,858 | 3/1973 | Gilbreath | 315/DIG. 4 X |

*Primary Examiner*—Nathan Kaufman

*Attorney, Agent, or Firm*—Paul E. Rochford; Philip L. Schlamp

[57] ABSTRACT

A phase control circuit for fluorescent lamps having low radio frequency noise signal generation characteristics which comprises a pair of control circuit terminals for connection into one power supply line of a pair for supply of conventional alternating current power.

3 Claims, 1 Drawing Figure

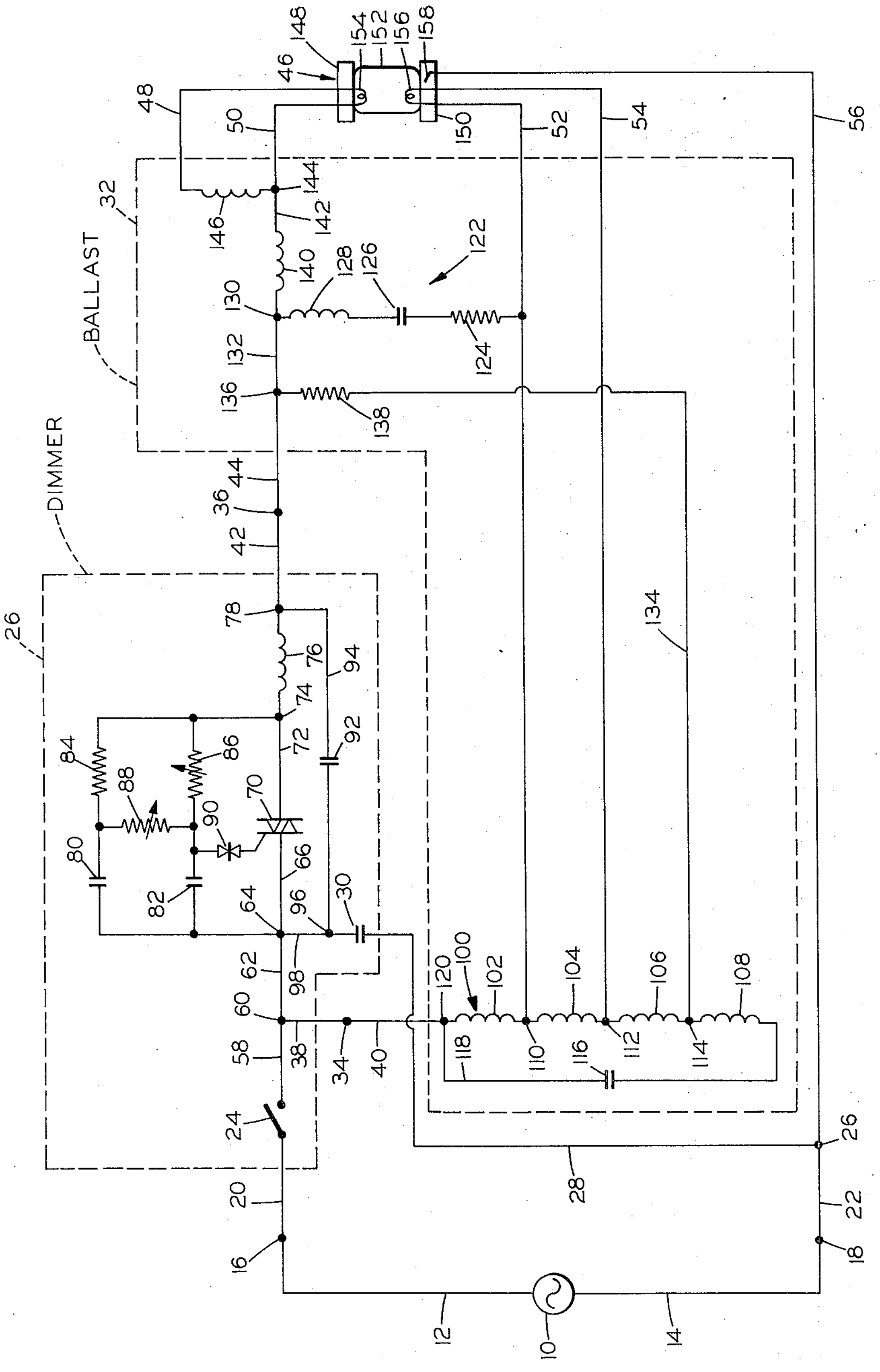
BALLAST
DIMMER

LOW NOISE DIMMER FOR FLUORESCENT LAMPS

BACKGROUND OF THE INVENTION

Most occupants of houses having small radios have found that there is some increase in the background noise level or static level of the radio when certain fluorescent lights or other electrical units such as electric drills, electric shavers and the like are operated. To find out which is the offending electrical unit each can be turned off in sequence until there is a noticeable drop in the background noise level of the radio. Beneficial use of radios in such households is sometimes dependent on following an alternative course of physically relocating the radio within the home, or within a room of the home, or plugging the radio into a different branch circuit within the home.

Much of the interference with radio reception is that due to generation of radio frequency noise signals within the power line feeding power to the radio receiver. Some filters which filter such noise signals from the electric line are effective in reducing this source of interfering noise. What cannot be as effectively filtered is the radio frequency signals emitted from household electrical units and from lines supplying such units as these signals are radiated out of the unit or associated power line and can reach the radio receiver antenna through the air and create radio reception noises or static.

In fact one of the best tests of whether a particular electrical unit causes interference with radio use is a test which employs the radio itself as the sensing instrument.

A procedure which has been found useful in making tests of the comparative level of interference with radio reception due to generation of background noise is one which employs a conventional household radio receiver but which screens all radio signals from the receiver by enclosing it and its antenna in a metal box. By enclosing the entire radio and antenna within a metal shield and by coupling the conventional line coupling antenna of the radio to a power line passing through the box, the only signals effectively detected are noise signals emanating from the power line plus those noise signals entering the radio circuit through the power supply line to the radio. Where noise signals are filtered out of the power line supplying the radio, an effective measurement is made of radio signals emanating from an offending line passing through the metal box and coupled to the antenna. Such a test apparatus is useful in comparing the level of noise signal production from phase control circuits and devices where the line controlled by such circuits is the line coupled in the box to the conventional radio receiver antenna.

To ensure that the test can be used to accurately compare levels of radio interference noise produced by such devices the power line to which the antenna is coupled is, as indicated above, a power line shielded within a metal enclosure containing the radio, and is a power line extending between a dimmer switch and the load controlled by the switch. This line is referred to in this application as the phase controlled power line or controlled power line.

In comparing production of radio interference noise signals by dimmer devices this controlled power line is the best place to couple the coupling antenna because the level of any noise signals generated by dimmer operation along this line is higher than at any other point in any other line in a conventional household power circuit.

Comparison of noise signal levels produced by different dimmer devices can be made on a sound basis where one dimmer device is substituted for another in the controlled line to which a coupling antenna is coupled or where modifications are made to a single device in a controlled line and where the readout of the level of noise signal production is made from the noise heard from the speaker of a conventional household radio receiver shielded as indicated above from reception of normal radio signals. Such comparison is on a sound basis because the level of noise signals from the power line or from other sources in a conventional household branch is of a very small magnitude when measured against the level of noise signals generated by operation of any noise producing device and in this case a dimmer device as normally present in a power control line.

By normally present in a controlled power line is meant the level of noise signals which would be detected in the same line if a conventional on-off switch in such a line is closed to by-pass a dimmer device.

BRIEF DESCRIPTION OF THE DRAWING

In the drawings FIG. 1 is a circuit diagram of a low noise dimmer as taught herein shown in its relation to other elements of a ballast and fluorescent lamp.

DESCRIPTION OF THE PREFERRED EMBODIMENT

Referring now to the drawing a conventional source of alternating current 10 furnishes power through lines 12 and 14 to two terminals 16 and 18. These terminals represent the connections of a conventional branch circuit within a building to the electric service supplied to the building through service entrance of conventional design none of which is illustrated.

Line 20 connects terminal 16 to switch 24 an on-off switch forming part of a dimmer circuit enclosed within dashed line 26.

The dimmer circuit is connected into one side of the conventional source of electricity by line 20 from switch 24 and it is connected to the other side of the conventional source from a condensor 30 through line 28, terminal 26 and line 22.

Th dimmer portion of the circuit illustrated in the FIGURE is also connected to a ballast portion of the circuit, the components of ballast portion being shown enclosed within dashed line 32. The connections between the dimmer portion of the circuit and the ballast portion are through terminals 34 and 36 and include lines 38 and 40 connected to terminals 34 and 42 and 44 connected to terminal 36.

The ballast portion of the circuit as represented within dashed line 32 is electrically connected to a conventional fluorescent lamp 46 through lines 48, 50, 52, and 54.

Lamp 46 is also electrically linked directly to the source of power through line 56, terminal 26 and the elements listed above linking terminal 26 to the power source 10.

Considering in the further detail the dimmer portion of the circuit, the dimmer includes a main power line. The main power line includes switch 24, line 58, terminal 60, line 62, terminal 64, line 66, bi-directional solid state switch 70, line 72, terminal 74, coil 76, and terminal 78 which is connected to line 42 referred to above.

The dimmer portion of the illustrated circuit also includes a phase shift triggering network made up of condensors 80 and 82, resistor, trim pot resistor 88 and variable resistor 86, as well as a bi-directional trigger device 90. It also includes a by-pass condensor 92 in line 94 extending between terminal 78 and terminal 96. The connection of terminal 96 to terminal 64 through line 98 puts condensor 92 in parallel with series combination of solid state switch 70 and coil 76.

Referring next to the detailed portion of the illustrated circuit enclosed within line 32, this ballast portion of the circuit is of conventional design and does not constitute part of the invention described herein.

The ballast includes a high reactance transformer 100 having segments 102, 104, 106, and 108 and having voltage tap terminals 110, 112, and 114 therebetween. A power factor correction capacitor 116 is connected in parallel with transformer 100 in line 118 extending between segment 108 and a terminal 120 of segment 102.

Voltage tap terminals 110 and 112 are connected by lines 52 and 54 respectively to a fluorescent lamp 46 as described below.

A peaking circuit 122 includes a resistor 124, a condensor 126 and a reactance 128 in series connection extending between line 52 and terminal 130 in line 132.

Line 134 connects voltage tap 114 to terminal 136 in line 132 through holding current resistor 138.

Ballast coil 140 is located in line 142 extending between terminal 130 and terminal 144.

Filament voltage coil 146 is connected in line 48 which is one of the lines connecting the ballast structure enclosed within broken line 32 with fluorescent lamp 46.

Considering next the fluorescent lamp 46, this structure shown schematically to illustrate circuit connections. It includes two conventional lamp-holders 148 and 150 and a lamp bulb 152 having a conventional glass envelope. Within the bulb 152 are two filaments 154 and 156.

Lampholder 148 has pass through connections between the filament 154 and supply lines 48 and 50. Lampholder 150 has pass through connections between filament 156 and supply lines 52 and 54. However, it also has a circuit interrupting switch 158 which provides a means of disconnecting power from the ballast 32 during lamp removal for safety.

The operation of the lamp 46 and of the ballast which furnishes power to the lamp is conventional. In such operation, however, noise signals are generated because the fluorescent lamp is itself a rapid turn on device. It is known that radio noise signals are emitted when there is a very rapid change in the flow of current in a circuit. It is also known that the conventional fluorescent light circuit operates according to such a rapid turn-on mode, thus causing emission of radio signals when in normal use with no dimmer in the power supply circuit.

A dimmer is also a rapid turn-on device inasmuch as when the solid state switching action occurs the impedance of the switch goes from a high value to a very low value in a very short interval during each half cycle of the normal 60 cycle power supply flow of current. The rapid drop in impedance is accompanied by, particularly where it occurs at mid-cycle, a very rapid rise in current flow in the circuit and by a generation of radio noise signals.

The combination of a fluorescent lamp circuit with conventional fluorescent dimmer control circuit can be particularly offensive with regard to radio noise signal production because the combined effect can be an additive in the sense that noise signal generation is apparently greater than would be generated by either device operating without the other, as for example where the dimmer is replaced by an on-off switch or where the fluorescent lamp is replaced by an incandescent lamp.

Surprisingly I have found that the level of noise signal generation in such fluorescent dimmer control circuits can be very substantially diminished.

Normally reduced generation of radio noise signals result from increase in the size of coil 76 or from increase in the number of windings of the coil. However, reduction of noise signal production in this manner is limited by the size of the coil, the complexity of windings involved, the associated increased cost as well as the increased heat produced from a larger coil.

Some reduction in the generation of radio noise signals is also accomplished by increasing the size of capacitor 92. Here again, however, there are limits on the degree of increased size which is feasible because larger capacitors permit 60 cycle power to by-pass the solid state switch and to reach the ballast directly causing undesireable flickering of the lamp.

In a conventional 600 watt dimmer, use of condensors above 0.1 microfarad tend to result in flicker of the controlled fluorescent lamp.

Some further reduction of radio noise generation has been achieved in the past by selection of values for coil 76 or condensor 92 which are particularly effective or matched for a particular level of controlled power to effectively provide a reasonant relationship between the two components. This is in effect an attempt to match the capacitor 92 and coil 76 to eliminate production of radio noise signals in frequencies within the braodcast band of frequencies. However, as the level of controlled power is changed as the dimmer is operated, and the level of current passing through coil 76 is increased, the radio noise signal level rises again.

Still another way in which attempts have been made to reduce radio noise signal production is by omitting line 94 and condensor 92 and by including a condensor such as 30 in line 28. One advantage of such arrangement is that it is possible to include a larger condensor in a line 28 than could be included in line 94. However, size is again limited as undesirable side effects. Such side effects include destruction of the excessive capacitance results in capacitor from relatively high charging current surges in the line. For a 600 watt dimmer, an upper limit for a capacitor in line 28 is about 0.2 microfarads. One problem with inclusion of a capacitor in line 28 is that its operation depends to an appreciable degree on the arrangement of various wires in an actual installation as for example the actual length of a wire such as 28, and its proximity to other wires used in installation of the ballast and fluorescent lamp.

Applicant has discovered that improved radio noise signal production is achieved when a combination of a coil 76 is employed together with a capacitor included at 30 in line 28 and a capacitor 92 in a line 94.

Further, Applicant has discovered that the maximum reduction of radio noise signal production is not achieved by use of capacitors of maximum capacitance at each of the locations indicated but rather that capacitors of lower capacitance should preferably be used both in line 28 and in line 94.

Moreover, Applicant has discovered that where such capacitors of lower capacitance are used both in line 28 and in line 94 that a substantial reduction in radio noise signal production is achieved even though an inductor 76 is selected having a lower value. In other words, the number of turns of inductor 76 can be reduced without appreciably increasing radio noise signal production where capacitors 30 and 92 are included in the dimmer circuit at lower than their maximum permissable capacitance.

It is known that for a constant level of radio noise signal production, it is possible to reduce the inductance of a coil such as 76 if the capacitance of a capacitor such as 92 in parallel with coil and switch 70 in increased by a compensating amount.

As indicated above for maximum reduction of radio noise signal production, the values of these two components has been maximized according to prior art practices within the range feasible where factors such as heat production, lamp, flicker, and the like, as discussed above, are considered.

By contrast according to this invention, a greater reduction in radio noise signal production is achieved where the values of inductance and capacitance are reduced and where such reduction is done in combination with inclusion of a capacitor of less than maximum permissible value in a line such as 28 to the other side of the line, preferably the white or neutral line 22.

The circuit has been tested using the testing circuit outlined above and found to give much improved performance in actual radio operation.

What is claimed as new and desired to be secured by letters Patent of the United States is:

1. A phase control circuit for fluorescent lamps having low frequency noise signal generation characteristics, said phase control circuit comprising a first terminal, a second terminal and a common terminal, said first terminal and said common terminal providing an input for said phase control circuit, and said second terminal and said common terminal providing an output for said phase control circuit;

a solid state switch and a coil in series connection between said first terminal and said second terminal;

triggering means for supplying trigger signals to said solid state switch;

a first high frequency signal path comprising a first capacitor in parallel with said series connected solid state switch and coil;

a second high frequency signal path comprising a second capacitor between said first terminal and said common terminal;

the capacitance of said first capacitor being between 0.047 microfarads and 0.15 microfarads, and the capacitance of said second capacitor being between 0.047 microfarads and 0.22 microfarads.

2. The circuit of claim 1 in which the capacitance of the first capacitor is 0.15 microfarads and the capacitance of the second capacitor is 0.1 microfarads.

3. The circuit of claim 1 in which the phase control circuit includes a variable resistor and a calibrating resistor in said triggering means.

* * * * *